US006416627B1

(12) United States Patent
Cunkle et al.

(10) Patent No.: US 6,416,627 B1
(45) Date of Patent: Jul. 9, 2002

(54) POLYMERIC STABILIZERS WITH HIGH AFFINITY TO PULP

(75) Inventors: Glen T. Cunkle, Stamford, CT (US); David Devore, Nyack; Thomas F. Thompson, Highland Mills, both of NY (US)

(73) Assignee: Ciba Specialty Chemicals Corporation, Tarrytown, NY (US)

( * ) Notice: Subject to any disclaimer, the term of this patent is extended or adjusted under 35 U.S.C. 154(b) by 0 days.

(21) Appl. No.: 09/658,923

(22) Filed: Sep. 11, 2000

Related U.S. Application Data

(60) Provisional application No. 60/154,111, filed on Sep. 15, 1999.

(51) Int. Cl.$^7$ .......................... D21H 17/33; C08K 5/34
(52) U.S. Cl. .................. 162/168.5; 524/99; 162/168.1; 162/168.2
(58) Field of Search ............................. 162/70, 71, 72, 162/127, 157.2, 157.4, 157.5, 158, 160, 164.1, 164.3, 166, 167, 168.1, 168.2, 169, 183, 184, 185; 252/399, 401; 503/209; 546/184, 185, 246; 524/87, 99

(56) References Cited

U.S. PATENT DOCUMENTS

| | | | | | |
|---|---|---|---|---|---|
| 4,295,931 A | * | 10/1981 | Dumas | ........................ | 162/158 |
| 5,181,988 A | * | 1/1993 | Akutsu et al. | ............... | 162/135 |
| 5,393,338 A | * | 2/1995 | Pudney et al. | ............... | 106/238 |
| 5,928,558 A | | 7/1999 | Cunkle et al. | ......... | 252/182.18 |
| 5,932,735 A | * | 8/1999 | Cunkle et al. | ............... | 546/242 |

FOREIGN PATENT DOCUMENTS

| | | | | |
|---|---|---|---|---|
| CA | 2164394 | | 6/1996 | |
| EP | 0389421 | | 9/1990 | |
| JP | 359047259 | * | 3/1984 | ......... C08L/101/00 |
| WO | 97/36041 | | 10/1997 | |
| WO | 98/54174 | | 12/1998 | |
| WO | WO 99/05108 | * | 2/1999 | ......... C07D/211/94 |
| WO | 00/14134 | | 3/2000 | |

OTHER PUBLICATIONS

C. Heitner in "Photochemistry of Lignocellulosic Materials", C. Heitner, J.C. Sciano, eds.; ACS Sym. Ser. 531, pp. 1–25 (1993).

I. E. Arakin et al., Khimiya drevesiny (Chemistry of wood), 1982, No. 2, p. 114.

A. D. Sergeev et al., Khimiya drevesiny (Chemistry of wood), 1984, No. 5, pp. 20–22.

V. I. Khodyrev et al., Vysokomol. Soyed. A29: No. 3, pp. 616–621, 1987 [Polymer Science U.S.S.R. vol. 29, No.3, pp. 688–694, 1987].

M.–K. Syler et al., Journal of the Association of Paper and Pulp Technology: 29, pp. 135–140 (Mar. 1990).

P. Fornier de Violet et al., Cellulose Chem. Technol., vol. 24, pp. 225–235 (1990).

R. Agnemo et al., 6$^{th}$ International Symposium on Wood and Pulping Chemistry, vol. 1, Appita 1991, pp. 631–637.

S. Omori et al., Journal of the Association of Paper and Pulp Technology: 48, pp. 1388–1394, Nov. 1993.

M. Paulsson et al., 8$^{th}$ Symposium Wood and Pulping Chemistry, vol. III, Helsinki 1995, pp. 61–66.

Z.–H. Wu et al., Holzforschung, 48, pp. 400–404, (1994).

Eds.: C. Dence et al., Pulp Bleaching–Principles and Practice, 1996, C. Heitner, Section III, Chapter 5, Chemistry of Brightness Reversion and Its Control, pp. 183–212.

* cited by examiner

*Primary Examiner*—Peter Chin
*Assistant Examiner*—Eric Hug
(74) *Attorney, Agent, or Firm*—Tyler A. Stevenson; Luther A. R. Hall

(57) ABSTRACT

Selected polymeric stabilizers with pendant nitroxide, hydroxylamine or hydroxy-ammonium salt groups B are water soluble or water dispersible and have high affinity to pulp or paper. These stabilizers prevent the loss of brightness and enhance resistance to yellowing in pulp or paper, especially pulp or paper containing lignin. These compounds are added at various points in the paper-making process, especially at the wet ends, making the need for water soluble or water dispersible materials having high affinity for pulp or paper essential. This performance is often further enhanced by the presence of one or more coadditives selected from the group consisting of the UV absorbers, the polymeric inhibitors, the nitrones, the fluorescent whitening agents and metal chelating agents. Combinations of hydroxylamines or their salts, benzotriazole or benzophenone UV absorbers and a metal chelating agent are particularly effective.

12 Claims, No Drawings

POLYMERIC STABILIZERS WITH HIGH AFFINITY TO PULP

This application claims benefit under 35 USC 119(e) of U.S. Provisional Application No. 60/154,111, filed Sep. 15, 1999.

The instant invention pertains to novel polymeric stabilizers which contain nitroxide, hydroxylamine or hydroxylammonium salt groups which are useful for preventing loss of brightness and for enhancing resistance to yellowing in pulp or paper still containing lignin. This performance is often further enhanced by the presence of one or more coadditives selected from the group consisting of the UV absorbers, the polymeric inhibitors, the nitrones, the fluorescent whitening agents and metal chelating agents. Combinations of hydroxylamines or their salts, benzotriazole or benzophenone UV absorbers and a metal chelating agent are particularly effective.

BACKGROUND OF THE INVENTION

High-yield and ultra high-yield wood pulps undergo rapid light induced discoloration, particularly when they are exposed to near ultraviolet radiation (wavelengths 300–400 nm) in indoor fluorescent light and daylight. This characteristic restricts their use to short-life, low-value paper products. High-yield and ultra high-yield wood pulps can be bleached to a high level of whiteness. If this whiteness could be stabilized against discoloration, these bleached high-yield pulps could displace significant amounts of more expensive fully-bleached, low-yield chemical pulps.

This discoloration is ascribed to the substantial lignin content of high-yield pulps totalling about 20–45% by mass. Phenoxy radicals are the key intermediates in the reaction mechanism. Several light induced reactions have been proposed to account for their formation such as abstraction of a hydrogen atom from phenolic groups, cleavage of the aryl ether bond of phenacyl aryl ether groups, or the breakdown of ketyl radicals fromed from saturated aryl-glyerol β-aryl ether structures in lignin. The phenoxy radicals are oxidized by other oxygen-centered radicals (alkoxy, peroxy, hydroxy and perhydroxy) to form yellow chromophores as taught by C. Heitner in "Photochemistry of Lignocellulosic Materials", C. Heitner, J. C. Sciano, eds.; ACS Sym. Ser. 531, 1–25 (1993).

I. E. Arakin et al., Khymiya drevesiny (Chemistry of Wood), 1982, No. 2, 114 and A. D. Sergeev et al., ibid, 1984, No. 5, 20 disclosed that the use of iminoxyl radicals such as TEMPO (1-oxyl-2,2,6,6-tetramethylpiperidine) is useful in the delignification of wood using the one-stage oxygen-soda (alkaline) process, but made no mention or suggestion of any activity provided by TEMPO on preventing light-induced discoloration of paper or pulp made from such treated wood.

EP 717,143 and WO 97/36041 describe a multicomponent system for changing, reducing or bleaching lignin and lignin-containing materials which comprise an oxidation catalyst, and an N-hydroxyl mediator compound such as N-hydroxyphthalimide or a dialkyl-hydroxylamine. These references are aimed at the delignification of wood. There is no mention or suggest of any activity provided by the N-hydroxyl compounds in preventing the light-induced discoloration of paper or pulp made from such treated wood.

V. I. Khodyrev et al., Vysokomol soyed, A29, No. 3, 616 (1987) [Polymer Sci. U.S.S.R., 29, No. 3, 688 (1987)] show that the photoinitiated oxidation by oxygen causes weathering of cellulosic textile materials such as flax or cotton, and that the light stability of the cellulose could be improved by photostabilizers such as the UV absorbers, benzophenols and 1-oxyl-2,2,6,6-tetramethyl-4-hydroxypiperidine. The UV absorbers offer no protection, and are actually detrimental. The authors noted that the stable nitroxyl radical interacts with alkyl radicals in the cellulose to afford its salubrious stabilizing activity. There is no suggestion by the authors that this stabilizing activity could be applied successfully in wood pulp and/or paper made therefrom.

M-K. Syler et al., J. Assn. Paper Pulp Tech, 29, 135 (1990) show that selected metal salts such as magnesium sulfate and lower alkanoic acids inhibit color reversion in bleached pulp.

P. Fornier de Violet et al., Cellulose Chem. Tech., 24, 225 (1990) show that the use of UV absorbers and hydrogen donor agents such as thiols, ascorbic acid, etc. help prevent the photoinduced discoloration of hydrogen peroxide bleached wood pulp, but that chain breakers such as hindered phenols and hindered amines (having >N–H or >N—$CH_2$— moieties) had no or even a detrimental effect on preventing photoinduced discoloration.

R. Agnemo et al., 6th International Symposium on Wood and Pulping Chemistry, Appita, 1991, confirmed that free hydroxyl radicals plus lignin lead to undesirable photoyellowing in pulp and paper.

S. Omori et al., J. Assn. Paper Pulp Tech, 48, 1388 (1993) describes the effect of antioxidants and UV absorbers on light reversion and concludes that the combination of an antioxidant and UV absorber prevents color reversion and has a synergistic effect in that activity.

M. Paulsson et al., 8th International Symposium Wood and Pulping Chemistry, Helsinki, 1995, show that efficient photostabilization of unbleached paper or hydrogen peroxide bleached TMP pulp can be achieved by acetylation.

There have been a number of different approaches proposed to inhibiting the yellowing of mechanical pulps. These include: radical scavengers and antioxidants; UV screens; elimination of chromophores after their formation; chemical modification of lignin by alkylation or acetylation; polymeric inhibitors; and two types of coadditives used in combination. Z-H. Wu et al., Holzforschung, 48, (1994), 400 discuss the use of radical scavengers like phenyl-N-tert-butyinitrone to reduce the formation of chromophores during mechanical pulping and give a more light-stable pulp.

C. Heitner, "Chemistry of Brightness Reversion and It Control, Chapter 5", in Pulp Bleaching-Principles and Practice, C. W. Dence, D. W. Reeve, Eds., TAPPI, Atlanta, 1996, pp 183–211, summarizes the state of the art in the thermal and light-induced yellowing of lignin-containing pulps such as thermomechanical (TMP) and chemithermomechical (CTMP) pulps, showing the seriousness of these undesirable effects discusses generally the then current prior art methods used to attack this problem. These include bleaching, the use of phosphites, UV absorbers, polyalkylene glycols and free radical scavengers such as ascorbic acid, thiols, thioethers, dienes and aliphatic aldehydes and chelating agents such as ethylenediaminetetra-acetic acid (EDTA). The author concluded that, although much progress had been made, much still remains to be done before a successful and practical solution to this loss of brightness and undesirable yellowing of lignin-containing pulp and/or paper is found.

Copending applications Ser. Nos. 09/119,567; 09/234,253; Nos. 60/116,687 and 60/116,688 describe potential solutions where the use of selected hindered amine nitroxides, hindered amine hydroxylamines, N,N-dialkylhydroxyamines or their salts in combination with selected UV absorbers and metal chelating agents is seen to prevent loss of brightness and to enhance resistance to yellowing in mechanical or chemical pulp or paper, particularly mechanical pulp or paper still containing significant amounts of lignin.

The instant invention provides novel polymeric materials which contain nitroxide, hydroxylamine or hydroxylammonium salt groups which either alone or in combination with UV absorbers, metal chelating agents and/or fluorescent whitening agents are useful in preventing loss of brightness and in enhancing resistance to yellowing in pulp or paper still containing lignin.

DETAILED DESCRIPTION OF THE INVENTION

The instant invention discloses novel polymeric materials with pendant nitroxide, hydroxylamine or hydroxyammonium salt groups which are water compatible, either water soluble or water dispersible, and have high affinity for pulp and paper made therefrom. These stabilizers when applied to pulp which still contains lignin alone or in combinations with UV absorbers, metal chelating agents, fluorescent whitening agents, sulfur containing inhibitors, phosphorus containing compounds, nitrones, benzofuran-2-ones and/or stabilizing polymers effective light and thermal stability is achieved.

The instant stabilizers comprise of polymer P with pendant groups A. Groups A are attached to polymer P with bridging groups B

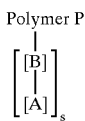

Polymer P is selected from the following polymers or oligomers

1) Polyethylene imine

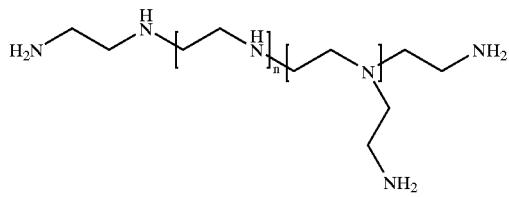

of molecular weights of 500 to 2,000,000.

2) Oligomeric ethylene amines

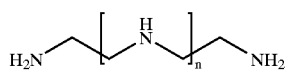

where n ranges from 0 to 10, preferably from 1 to 3.

3) Random diallylamino copolymers comprising structural units of the formulae

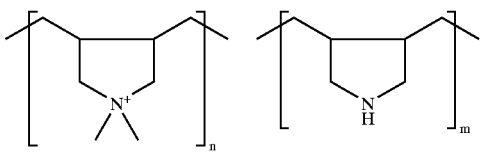

where n ranges from 0 to 8000, preferably 2 to 8000, especially 2 to 100; and m ranges from 1 to 8000, preferably 1 to 100.

4) Polyacrylamides of the formula

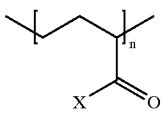

where n=10 to 5000 and X is $NH_2$, $NHCH_2N(CH_3)_2$, $OCH_2CH_2N(CH_3)_2$, $OCH_2CH_2N^+(CH_3)_3$ 5) Random oligomers or polymers of

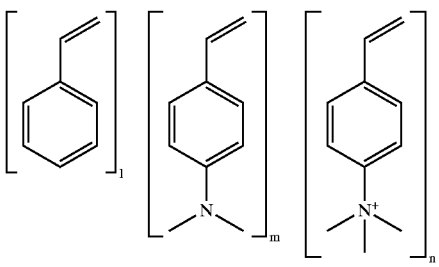

where I=0 to 8000, preferably 0 to 1000; m=1 to 8000, preferably 3 to 1000; and n=0 to 8000, preferably 0 to 1000.

6)

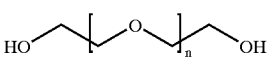

where n=5 to 1000

7)

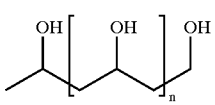

where n=5 to 8000

8)

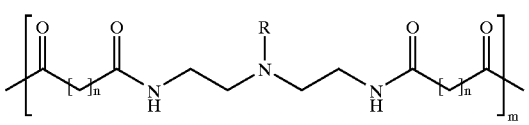

where n=1 to 10 and m=1 to 500 and R is hydrogen or alkyl of 1 to 4 carbons and end groups are preferably OH.

9) Random copolymers of

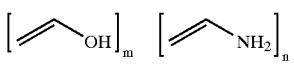

where n=5 to 4000 and m=5 to 4000
10) A copolymer of dimethylamine and epichlorohydrin

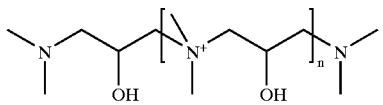

where n=1 to 100.

Reactive sites on these polymers for attachment of side chains —B—A are amino groups (usually not amido groups) and OH groups, wherein usually a hydrogen atom is replaced by the side chain —B—A. Tertiary amino groups, as present e.g. in polymer (5), may react with formation of a quaternary amino group, resulting e.g. with polymer (5) in a unit of the formula

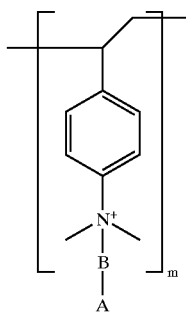

The number of side chains s preferably is 1 to 1000, more preferably 1 to 100, most preferably 2 to 100, especially 2 to 50.

Groups A are of Formula I or IA

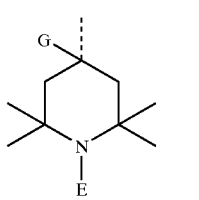

I

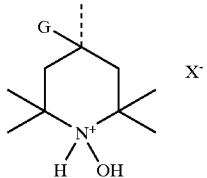

IA where the 4 position on the piperidine ring (dotted line) is attached to the polymeric structures above and
  G is hydrogen, amino, hydroxyl or cyano;
  E is oxyl, hydroxyl, alkoxy, alkoxy substituted by hydroxyl, oxo or carboxy or interrupted by oxygen or carboxy, cycloalkoxy, alkenyloxy, cycloalkenyloxy, aralkyl, aralkoxy, acyl, R(C=O)O—, RO(C=O)O—, RN(C=O)O—or chloro, where R is an aliphatic or aromatic moiety.

Any alkyl group within these definitions are preferably $C_1$–$C_{18}$alkyl comprising methyl, ethyl, propyl such as n- or isopropyl, butyl such as n-, iso-, sec- and tert-butyl, pentyl, hexyl, heptyl, octyl, nonyl, decyl, undecyl, dodecyl, tridecyl, tetradecyl, pentadecyl, hexadecyl, heptadecyl or octadecyl. Alkoxy is O-alkyl, preferably $C_1$–$C_8$alkoxy. Cycloalkyl usually is $C_5$–$C_{12}$cycloalkyl, preferably cyclohexyl. Alkenyloxy is usually $C_3$–$C_{12}$alkenyloxy, especially allyloxy. Aralkyl and aralkoxy usually is of 7 to 15 carbon atoms and is preferably $C_7$–$C_{15}$phenylalkyl or $C_7$–$C_{15}$phenylalkoxy. Acyl is preferably $C_1$–$C_{12}$alkyl-CO, especially acetyl, $C_2$–$C_3$alkenyl-CO, benzoyl. R as an aliphatic or aromatic moiety is preferably $C_1$–$C_{18}$alkyl, phenyl, $C_7$–$C_5$phenylalkyl, cyclohexyl, $C_2$–$C_3$alkenyl.

Bridging groups B consist of one of the following divalent groups of formulae (1) to (17):

1) direct bond

2)

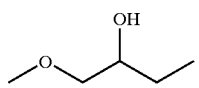

3)

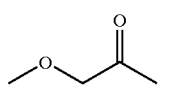

4)

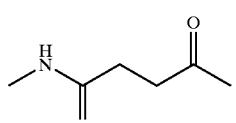

5)

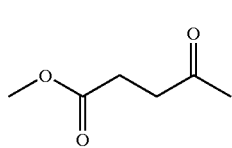

6)

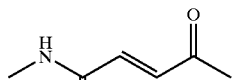

7)

8)

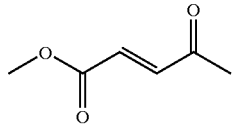

9)

10)

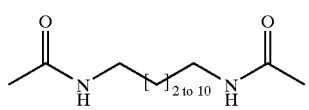

11)

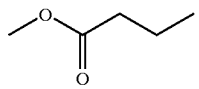

12)

[Structure: cyclohexane with two CH2-NH-C(=O)-CH3 (acetamidomethyl) groups]

13)

[Structure: R-N(CH3)-CH2-CH3 type fragment]

14)

[Structure: benzene ring with methyl group and two CH2-NH-C(=O)-CH3 groups]

15)

[Structure: triazine with X substituent and two methyl groups]

16)

[Structure: CH3-NH-CH2-CH(OH)-CH2-CH3]

17)

[Structure: R-N(CH3)-CH2-CH(OH)-CH2-CH3]

The instant stabilizers are obtained by reacting a polymer of formulae (1) to (10) with suitable educts known in the art according to or in analogy to methods known in the art or illustrated in present examples. For example, a direct bond (bridge 1) can be formed by the reductive amination of 1-oxyl-2,2,6,6-tetramethylpiperidin-4-one with a polymer containing primary or secondary amine groups (March, J *Advanced Organic Chemistry*-4$^{th}$ ed. Wiley-Interscience: New York, 1992 pp 900–902). By reacting the epoxide in 1-oxyl-2,2,6,6-tetramethyl-4-glycidyloxypiperidine (Cunkle, U.S. Pat. No. 6,080,864) with hydroxyl or amine groups in the select polymers, stabilizers with bridging group 3 can be obtained (March, *J Advanced Organic Chemistry*-4$^{th}$ ed. Wiley-Interscience: New York, 1992 pp 391 and 416). By forming esters or amides between the polymers and 1-oxyl-2,2,6,6-tetramethyl carboxy-piperidine or 1-oxyl-2,2,6,6tetramethyl-4-(carboxymethoxy)piperidine (Cunkle, U.S. Pat. No. 6,080,864) stabilizers with bridging groups 2 and 4 respectively can be obtained. Alkylating amine groups in the select polymers with 4-(ω-bromoalkoxy)-2,2,6,6-tetramethylpiperidine derivatives (Bossmann, S. H., etal. *Synthesis* 1996, 1313) can be used to generate stabilizers containing bridging group 9. With a Michael addition of primary and secondary amine groups in the select polymers to 1-oxyl-4-(acryloyloxy)-2,2,6,6-tetramethylpiperidine (Karrer, F. E. Makromol. Chem. (1980), 181(3), 595–634.) stabilizers with bridging group 11 can be formed.

Polyfunctional compounds such as succinic and maleic acid, 1,6-diisocyanatohexane and cyanuric chloride can be used to bridge compounds such as 1-oxyl-2,2,6,6-tetramethyl-4-hydroxypiperidine and 1-oxyl-2,2,6,6-tetramethyl-4-aminopiperidine with the select polymers by reacting with the hydroxyl or amino groups to generate stabilizers with bridging groups 5–8,10,12,14 and 15.

Piperidine educts carrying in 4-position an oxo, hydroxy, amino or carboxy group are known compounds. For example, 1-oxyl-2,2,6,6-tetramethylpiperidin4-one, 1-oxyl-2,2,6,6-tetramethyl-4-hydroxypiperidine, 1-oxyl-2,2,6,6-tetramethyl-4-aminopiperidine and 1-oxyl-2,2,6,6-tetramethyl-4-carboxy-piperidine are known compounds and can be obtained commercially (Aldrich Chemical Company).

Preferably for groups A of formulas I and IA, G is hydrogen or hydroxyl, especially hydrogen, and for formula I, E, is oxyl or hydroxyl.

When polymer P is 1) preferred bridging groups B are: 1, 2, 3, 4, 5, 7, 9 or 11.

When polymer P is 1) more preferred bridging groups B are: 1, 3, 9 or 11.

When polymer P is 1) most preferred bridging groups B are: 1 or 3.

When polymer P is 2) preferred bridging groups B are: 1, 2, 3, 4, 5, 7, 9 or 11.

When polymer P is 2) more preferred bridging groups B are: 1, 3, 9 or 11.

When polymer P is 2) more preferred bridging groups B are: 1 or 3.

When polymer P is 3) preferred bridging groups B are: 2, 3, 4, 5, 7, 9 or 11.

When polymer P is 3) more preferred bridging groups B are: 3, 9 or 11.

When polymer P is 3) the most preferred bridging group B is 3.

When polymer P is 4) preferred bridging groups B are: 3 or 9.

When polymer P is 4) the most preferred bridging group B is 3.

When polymer P is 5) preferred bridging groups B are: 3 or 9.

When polymer P is 6) preferred bridging groups B are: 2, 3, 4, or 9.

When polymer P is 6) the most preferred bridging group B is 2.

When polymer P is 7) preferred bridging groups B are: 2, 3, 4, or 9.

When polymer P is 7) the most preferred bridging group B is 2.

When polymer P is 8) preferred bridging groups B are: 3 or 9.

When polymer P is 8) the most preferred bridging group B is 3.

When polymer P is 9) preferred bridging groups B are: 1, 2, 3, 4, 5, 9 or 11.

When polymer P is 9) the most preferred bridging group B is 3.

When polymer P is 10) preferred bridging groups B are 3 or 9.

When polymer P is 10) the most preferred bridging group B is 3.

In general, preferred bridging groups B are a direct bond (1), carbonyl (2), or are of the formula 3, 4, 5, 7, 9 or 11; most preferred bridging groups are 1, 2, 3 or 9.

A preferred polymeric stabilizer according to the invention is the reaction product of one of the above polymers (1 to 10) with one or more compounds of the formula III to IXA

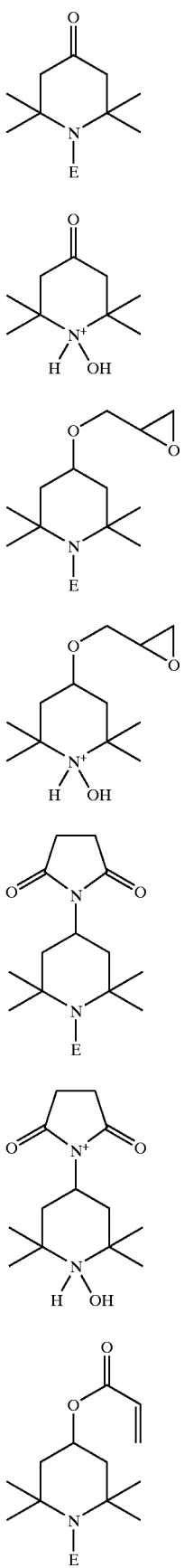

wherein Hal in formulae IX and IXA stands for halogen, especially for Cl or Br, and E in formulae III–IXA is as described above for formula I.

More preferably, the stabilizer of the invention is the reaction product of a polyethylene imine 1) of molecular weights 500 to 2,000,000, or an oligomeric ethylene amine 2); or of a a polymer 8)

with one or more compounds of the formula III to IXA;
or of a random copolymer 3) with one or more of the compounds of formulae III to IXA;
or of a polyacrylamide 4) with one or more of the compounds of formula IV, IVA, IX, IXA;
or of a random oligomer or polymer 5) with one or more of the compounds of formula IV, IVA, IX and IXA;
or of a diol 6) with one or more of the compounds of formula IV, IVA, VII, VIIA, VIII, VIIIA, IX and IXA;
or of polymer 7) of the formula

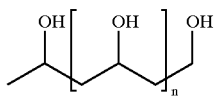

with one or more of the compounds of formula IV, IVA, VII, VIIA, VIII, VIIIA, IX and IXA;
or of a polymer 10) with one or more of the compounds of formula IV and IVA.

Most preferred is a polymeric stabilizer of the invention, which is the reaction product of a polyethylene imine 1), or of an oligomeric ethylene amine 2), or of a random copolymer 3), or of a polymer 8), or of a polymer 10), with one or more compounds of the formula III, IV, or IX, wherein Hal is Cl or Br and E is oxyl or OH.

The instant invention also pertains to a process for preventing the loss of brightness and for enhancing resistance to yellowing of a pulp or paper, particularly a chemimechanical or thermomechanical pulp or paper which still contain lignin, which comprises treating said pulp or paper with an effective stabilizing amount of a compound of any of those described above.

The effective stabilizing amount of the compounds is 0.001 to 5% by weight based on the pulp or paper. Preferably, the effective stabilizing amount is 0.005 to 2% by weight; preferably 0.01 to 1% by weight.

When a coadditive stabilizer is also present, the effective stabilizing amount of the coadditives is also 0.001 to 5% by weight based on the pulp or paper; preferably 0.005 to 2% by weight; most preferably 0.01 to 2% by weight; especially 0.01 to 1% by weight based on the pulp or paper.

The instant compositions may additionally include an effective stabilizing amount of at least one stabilizer selected from the group consisting of the UV absorbers, the polymeric inhibitors, the sulfur containing inhibitors, the phosphorus containing compounds, the nitrones, the benzofuran-2-ones, fluorescent whitening agents, hindered amine hydroxylamines and salts thereof, hindered amine nitroxides and salts thereof, hindered amines and salts thereof, benzofuran-2-ones and metal chelating agents.

The compositions which also include a UV absorber are especially preferred. The UV absorber is selected from group consisting of the benzotriazoles, the s-triazines, the benzophenones, the α-cyanoacrylates, the oxanilides, the benzoxazinones, the benzoates and the α-alkyl cinnamates.

Preferably, the UV absorber is a benzotriazole, an s-triazine or a benzophenone, most especially a benzotriazole UV absorber or benzophenone UV absorber.

Typical and useful UV absorbers are, for example, 5-chloro-2-(2-hydroxy -3,5-di-tert-butylphenyl)-2H-benzotriazole;
2-(2-hydroxy-3,5-di-tert-butylphenyl)-2H-benzotriazole;
2-(2-hydroxy-3,5-di-tert-amylphenyl)-2H-benzotriazole;
2-(2-hydroxy-3,5-di-αcumylphenyl)-2H-benzotriazole;
2-(2-hydroxy-3-α-cumyl-5-tert-octylphenyl)-2H-benzotriazole;
2-(2-hydroxy-5-tert-octylphenyl)2H-benzotriazole;
2-(2-hydroxy-3-tert-butyl-5-methylphenyl)-2H-benzotriazole-5-sulfonic acid, sodium salt;
3-tert-butyl-4-hydroxy-5-(2H-benzotriazol-2-yl)-hydrocinnamic acid;
12-hydroxy-3,6,9-trioxadodecyl 3-tert-butyl-4hydroxy-5-(2H-benzotriazol-2-yl)-hydrocinnamate;
octyl3-tert-butyl-4-hydroxy-5-(2H-benzotriazol-2-yl)-hydrocinnamate;
4,6-bis(2,4-dimethylphenyl)-2-(4-(3-dodecyloxy*-2-hydroxypropoxy)-2-hydroxyphenyl)-s-triazine (*is mixture of $C_{12-14}$ oxy isomers);
4,6-bis(2,4-dimethylphenyl)2-(4-octyloxy-2-hydroxyphenyl)-s-triazine;
2,4-dihydroxybenzophenone;
2,2',4,4'-tetrahydroxy-5,5'-disulfobenzophenone, disodium salt;
2-hydroxy-4-octyloxybenzophenone;
2-hydroxy-4-dodecyloxybenzophenone;
2,4-dihydroxybenzophenone-5-sulfonic acid and salts thereof;
2-hydroxy-4-methoxybenzophenone-5sulfonic acid and salts thereof;
2,2'-dihydroxy-4,4'-dimethoxybenzophenone-5,5'-disodium sulfonate; and
3-(2H-benzotriazol-2-yl)-4-hydroxy-5-sec-butylbenzenesulfonic acid, sodium salt (CIBAFAST® W).

Other preferred compositions are those which additionally contain a polymeric inhibitor; preferably poly(ethylene glycol), poly(propylene glycol), poly(butylene glycol) or poly(vinyl pyrrolidone).

Still other preferred compositions wherein the additional stabilizer is a sulfur containing inhibitor; preferably polyethylene glycol dithiolacetate, polypropylene glycol dithiolacetate, polybutylene glycol dithioacetate, 1-thioglycerol, 2-mercaptoethyl ether, 2,2'thiodiethanol, 2,2'-dithiodiethanol, 2,2'oxydiethanethiol, ethylene glycol bisthioglycolate, 3-mercapto-1,2-propanediol, 2-(2-methoxyethoxy)-ethanethiol, glycol dimercaptoacetate, 3,3'-dithiopropionic acid, polyethylene glycol dithiol, polypropylene glycol dithiol, polybutylene glycol dithiol or ethylene glycol bis(mercaptoacetate).

Other preferred compositions are those wherein the additional stabilizer is a phosphorus containing compound; preferably tris(2,4-di-tert-butylphenyl) phosphite, 2,2',2"-nitrilo [triethyl-tris(3,3',5,5'-tetra-tert-butyl-1,1'-biphenyl-2,2'-diyl) phosphite], bis(2,4-di-tert-butyl-6-methylphenyl) ethyl phosphite, sodium hydroxymethyl phosphinate, tetrakis(2, 4-di-butyl-phenyl) 4,4'-biphenylenediphosphonite, tris (nonylphenyl) phosphite, bis(2,4-di-tert-butylphenyl) pentaerythrityl diphosphite, 2,2'-ethylidenebis(2,4di-tert-butylphenyl) fluorophosphite or 2-butyl-2-ethylpropan-1,3-diyl 2,4,6-tri-tert-butylphenyl phosphite.

Still other preferred compositions are those wherein the additional stabilizer is a benzo-furan-2-one; preferably 5,7-di-tert-butyl-3-(3,4dimethylphenyl)-2H-benzofuran-2-one.

Still other preferred composition are those wherein the additional stabilizer is a metal chelating agent; preferably citric acid, keto acids, gluconates, heptagluconates, phosphates, phosphonates and aminocarboxylic acid chelates, such as ethylenediaminetetraacetic acid (EDTA), diethylenetriaminepentaacetic acid (DTPA), hydroxyethylethlenediaminetriacetic acid (HEDTA), nitrilotriacetic acid (NTA) and diethylenetriaminepentamethylenephosphonic acid (DTPMPA).

Some preferred compositions contain a mixture of additional stabilizers such as a mixture of a UV absorber and polymeric inhibitor; or a mixture of a UV absorber and a sulfur containing compound; or a mixture of a UV absorber and a phosphorus containing compound; or a mixture of a UV absorber and a metal chelating agent; or a mixture of a polymeric inhibitor and a sulfur containing compound; or a mixture of a polymeric inhibitor and a phosphorus containing compound; or a mixture of a sulfur containing compound and a phosphorus containing compound; or a mixture of a UV absorber, a polymeric inhibitor and a sulfur containing compound; or a mixture of a UV absorber, a polymeric inhibitor and a phosphorus containing compound; or a mixture of a UV absorber, a polymeric inhibitor, a sulfur containing compound and a phosphorus containing compound; or a mixture of a UV absorber, a polymeric inhibitor and a metal chelating agent.

Some preferred composition are those wherein the additional stabilizer is a mixture of a hindered amine hydroxylamine with at least one optical brightener such as 2,2'-[(1,1'-diphenyl)-4,4'-diyl1,2-ethenediyl]bis-benzenesulfonic, disodium salt {or bis[4,4'-(2-stilbenesulfonic acid)], disodium salt} which is TINOPAL®SK, Ciba.

Preferably the compositions are those wherein the compound of formula I, II, III, IA, IIA or IIIA is of low molecular weight or contains hydrophilic moieties or is both of low molecular weight and contains hydrophilic moieties.

The instant inhibitor additive system can be added to pulp or paper at a number of places during the manufacturing or processing operations. These include a. on a pulp slurry in the latency chest;
b. on a pulp slurry in or after the bleaching stage in a storage, blending or transfer chest;
c. on pulp during or after bleaching, washing and dewatering followed by cylinder or flash drying;
d. before or after the cleaners;
e. before or after the fan pump to the paper machine headbox;
f. to the paper machine white water;
g. to the silo or save all;
h. in the press section using a size press, coater or spray bar;
i. in the drying section using a size press, coater or spray bar;
j. on the calender using a wafer box;
k. on paper in an off-machine coater or size press; and/or
l. in the curl control unit.

Clearly, the precise location where the stabilizer additives should be added will depend on the specific equipment involved, the exact process conditions being used and the like. In some cases, the additives may be added at one or more locations for most effectiveness.

If the stabilizer or other coadditives are not themselves "water-soluble", they may be dispersed or emulsified by standard methods prior to application. Alternatively, the stabilizer and/or coadditives may be formulated into a paper sizing or paper coating formulation.

Stabilizers of present invention are also active as light stabilizers for organic materials, especially organic polymers. Thus, they may be applied with advantage in bulk polymers such as polyolefins, films, fibers, or in coatings. Substrates, coadditives and specific ways of application for this purpose include those known in the art, e.g. as described in U.S. Pat. No. 5,948,836 column 3, line 37, until column 9, line 61 (substrates); col. 1, line 46, until col. 3, line 36, and col. 17, line 65, until col. 25, line 30 (coadditives); and col. 17, lines 39–61, col. 26, lines 33–39, and the same col. 26, line 52, until col. 27, line 18, and col. 28, lines 11–17 (methods of application).

The following examples are for illustrative purposes only and are not to be construed to limit the instant invention in any manner whatsoever.

Handsheet Treatment

All additives are applied by syringe-injecting the appropriate weight % of additive combination in either an aqueous solution when the additive is water soluble, or a solution in 1:1 ethanol/dioxane, onto bleached thermomechanical pulp (BTMP) brightness squares (4 cm×4cm). The clamped sheets are allowed to air dry for one day.

The brightness of the handsheets is recorded before and after treatment by light exposure under controled intensity conditions.

Accelerated testing is carried out by subjecting the treated sheets to accelerated light induced yellowing in a fan-cooled light box containing eight fluorescent lamps with a spectral maximum output at 5700 Å with a total output approximately 43 times greater than normal office fluorescent lamps. The lamps are about ten inches away from the handsheets being illuminated.

Ambient testing is carried out by placing the treated handsheets on a desk under normal cool-white fluorescent office lights at a nominal distance of six feet.

In both cases, ISO brightness is tracked as a function of photolysis time and converted to post color number (PC number) in the usual manner.

Post color (PC) number is defined as follows:

$$PC=[(k/s)_{after}-(k/s)_{before}]\times 100$$

$$k/s=(1-R_{inf})^2/2R_{inf}$$

where k and s are the absorption and scattering coefficients, respectively, and $R_{inf}$ is the value of ISO brightness.

The relationship between $R_{inf}$ and the chromophore concentration is non-linear, whereas, the PC number is roughly linearly related to the concentration of the chromophore in the sample.

Low PC numbers are desired as they indicate less yellowing.

When, using the ambient test conditions, untreated BTMP handsheets are compared to Kraft handsheets after 60 days, the BTMP handsheets have a PC number which is about 10 while the Kraft paper has a PC number which is about 0.39. The Kraft handsheets are clearly less yellow than untreated BTMP handsheets after exposure to ambient light.

The incident light flux for the accelerated yellowing experiments (Examples 1–10) is 43 times greater than normal office fluorescent lamps as measured by the A. W. Speery SLM-110 digital light power meter. The brightness of the handsheets is tracked and compared to that of untreated sheets exposed in the same manner. The treated sheets exhibit significant resistance to yellowing as is seen below.

The following examples are for illustrative purposes only and are not to be construed to limit the instant invention in any manner whatsoever.

EXAMPLE 1

0.20 g (0.88 mmol) 1-oxyl-2,2,6,6-tetramethyl-4glycidyloxypiperidine is added to a solution of 6.06 g of the polyethyleneimine (Lupasol™ PS, BASF; 33% wt/tt in water, $M_W$ 750,000 and $M_n$ 60,000) and 13.94 g of water. The solution is stirred at ambient temperature for 2 hours. Analysis by thin layer chromatography indicates that all of the 1-oxyl-2,2,6,6-tetramethyl-4-glycidyloxypiperidine is grafted onto the polyethyleneimine.

EXAMPLE 2

1-oxyl-2,2,6,6-tetramethyl-4-oxopiperidine is reacted with polyethyleneimine Lupasol PEI ($M_W$=25,000; $M_N$=10,000; waterfree) under a hydrogen atmosphere with a Pt/C hydrogenation catalyst. The resulting polyethyleneimine polymer has pendant hydroxylamine groups.

EXAMPLE 3

1-oxyl-2,2,6,-tetramethyl-4-(3bromopropoxy)-piperidine is reacted with polyethyleneimine Lupasol PEI ($M_W$=25,000; $M_N$=10,000). The resulting polyethyleneimine polymer has pendant nitroxyl groups.

EXAMPLE 4

1-oxyl-2,2,6,-tetramethyl-4-(2-hydroxy4,7,10-triazadecyloxy)piperidine 2.21 g (9.7 mmol) of 1-oxyl-2,2,6,6-tetramethyl-4-glycidyloxypiperidine is added dropwise to a vigorously stirred solution of 1.0 g (9.7 mmol) diethylenetriamine dissolved in 50 mL of water. The mixture is stirred for 18 hrs. The water is removed under reduced pressure to yield 3.2 g of the product as a red oil.

EXAMPLE 5

1,7-Bis-(1-hydroxy-2,2,6,6-tetramethylpiperidin-4yl) 1,4,7-triazaheptane

A Parr shaker bottle containing 20.0 g (0.117 mol) 1-oxyl-2,2,6,6-tetramethylpiperidin-4-one, 6.0 g (0.058 mol) diethylenetriamine, 0.5 g 8% Pt/2% Pd on Carbon and 120 mL methanol is pressurized with hydrogen and shaken for 2 hours. The catalyst is removed by filtration and the solution is concentrated to 40 mL. The product is precipitates as a white solid with the addition of 200 mL of ethyl ether: mp 118–124° C.

EXAMPLE 6

25 g of a 20% aqueous solution of a copolymer of diallyldimethylammonium chloride (DADMAC) and diallylamine (DAA) (87 wt % DADMAC and 13 wt % DAA; $M_w$ 250,000) is diluted with 25 g of water. The pH is adjusted to 9.6 with 50% aq. NaOH. 0.77 g (3.4 mmol) 1-oxy-2,2,6,-tetramethyl-4-glycidyloxypiperidine is added to the solution and the reaction is stirred vigorously for 18 hours at room temperature. The solution is extracted with 2×50 mL ethyl acetate which removes 0.32 g of non-grafted 1-oxyl-2,2,6,6-tetramethyl-4glycidyloxypiperidine. The resulting DADMAC/DAA copolymer has pendant nitroxyl groups.

EXAMPLE 7

1-oxyl-2,2,6,6-tetramethyl-4-(3-bromopropoxy)-piperidine is reacted with a 20% aqueous solution of a copolymer of diallyldimethylammonium chloride (DADMAC) and diallylamine (DAA) (87 wt % DADMAC and 13 wt % DAA; $M_w$ 250,000). The resulting DADMAC/DAA copolymer has pendant nitroxyl groups.

EXAMPLE 8

1-Oxyl-2,2,6,6tetramethyl-4-glycidyloxypiperidine is reacted with a polymer of or a copolymer containing 2-(dimethylamino)ethyl-2-propenoate. The resulting polymer has pendant nitroxyl groups.

EXAMPLE 9

1-Oxyl-2,2,6,6-tetramethyl-4-glycidyloxypiperidine is reacted with a polymer of or a copolymer containing 4-(dimethylamino)-styrene. The resulting polymer has pendant nitroxyl groups.

EXAMPLE 10

1-hydroxy-2,2,6,6tetramethyl-4-(3-bromopropoxy)-piperidine is reacted with a polymer of or a copolymer containing 4-(dimethylamino)-styrene. The resulting polymer has pendant hydroxylamine groups.

EXAMPLE 11

A copolymer of diethylenetriamine (22.5 g, 0.218 mol) and adipic acid (29.0 g, 0.198 mol) is made by the procedure disclosed in U.S. Pat. No. 2,926,154. The resulting polymer has a $M_n$ of 3500. 10 g of a 50 wt % aqueous solution of this polymer is made. Four 0.54 g (2.3 mmol) aliquots of 1-oxyl-2,2,6,6-tetramethyl-4-glycidyloxypiperidine is added to the stirred polymer solution at 2 hr intervals. After the last addition the mixture is stirred for another 18 hours. Thin layer chromatography indicates that all the 1-oxyl-2,2,6,6tetramethyl-4-glycidyloxypiperidine has grafted onto the poymer.

EXAMPLE 12

A 250 mL—3-neck round-bottom flask equipped with an addition funnel, a condenser chilled to −10° C., a mechanical stirrer and a bubbler filled with water is charged with 50 mL of 40% aq. (w/w) dimethylamine (DMA: 17.96 g; 0.398 mol). The flask is heated to 75° C. and 25.5 mL (30.15 g, 326 mol) of epichlorohydrin is added dropwise over a period of 1 hour. After the epichlorohydrin addition, the reaction is stirred for 2 hours. The water from the bubbler is added to the reaction mixture and more water is added to the bubbler. The reaction is stirred for another 2 hours and then cooled to room temperature. The resulting solution has a solids content of 56% and the copolymer is exclusively dimethylamine end-capped. To 10.0 g of the polymer solution is added 0.44 g (1.9 mmol) of 1-oxyl-2,2,6,6-tetramethyl-4-glycidylpiperidine and the reaction is stirred for 18 hours. The reaction solution is washed twice with 25 mL of ethyl acetate.

EXAMPLE 13

Accelerated Yellowing with High Intensity Lamps

A BTMP sheet is treated with 1.0% by weight of the compound from Example 4. BTMP sheets are treated with the compounds from Examples 6, 11 and 12 at amounts to achieve the same nitroxide concentration as achieved with the first sheet. The sheets treated with these novel stabilizers exhibit substantial inhibition to yellowing compared to the untreated control sheet. Post color (PC) numbers determined after the indicated illumination time are shown in the following table. Low PC numbers are desired as they indicate less yellowing.

PC Number

| Time in days | Blank | Example 4 | Example 6 | Example 11 | Example 12 |
|---|---|---|---|---|---|
| 0 | 0.0 | 0.0 | 0.0 | 0.0 | 0.0 |
| 1 | 3.0 | 1.5 | 1.8 | −0.1 | 2.1 |
| 2 | 5.3 | 2.9 | 3.4 | 1.2 | 3.7 |
| 3 | 7.9 | 4.5 | 5.8 | 3.2 | 5.6 |
| 6 | 14.1 | 7.6 | 11.0 | 7.1 | 102 |
| 8 | 16.7 | 9.0 | 13.0 | 8.5 | 12.2 |
| 10 | 19.2 | 10.6 | 15.2 | 10.2 | 14.1 |

What is claimed is:

1. A stabilizer comprising of a polymer P with pendant groups A, which are attached to polymer P with bridging groups B

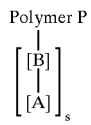

wherein s ranges from 1 to 50,000, and polymer P is selected from the polymers or oligomers 1) to 10)

1) polyethylene imine of formula

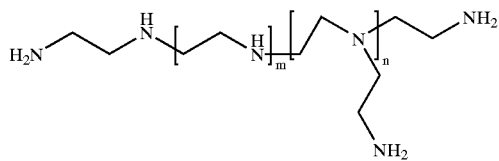

where m+n is 10 to 50,000;

2) oligomeric ethylene amines of formula

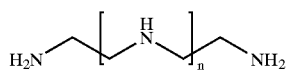

where n ranges from 0 to 10;

3) random diallylamino cooligimers or copolymers containing 1 to 8000 units of the formula

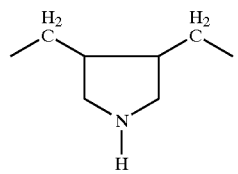

and 2 to 8000 units of the formula

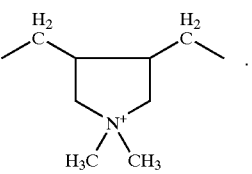

4) polyacrylamides of the formula

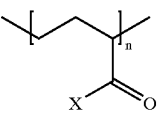

where n ranges from 10 to 5000 and X is $NH_2$, $NHCH_2N(CH_3)_2$, $OCH_2CH_2N(CH_3)_2$, or $OCH_2CH_2N^+(CH_3)_3$;

5) random cooligomers or copolymers formed from polymerization of

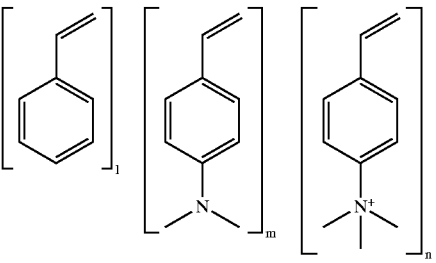

where l ranges from 0 to 8000, m from 1 to 8000 and n from 0 to 8000;

6) diols of the formula

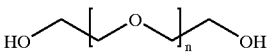

where n ranges from 5 to 8000;

7)

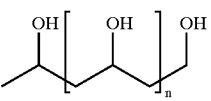

8) where n ranges from 5 to 8000;

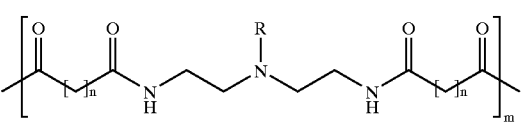

where n ranges from 1 to 10 and m ranges from 1 to 500 and R is hydrogen or alkyl of 1 to 4 carbons;

9) random copolymers of

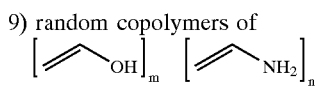

where n ranges from 5 to 4000 and m from 5 to 4000;
10) copolymers of dimethylamine and epichlorohydrin of the formula

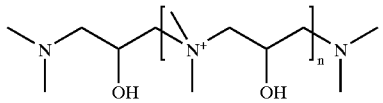

where n ranges from 1 to 100;
groups A are of formula I or IA

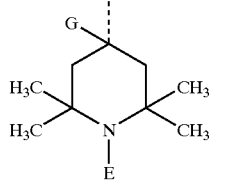    I

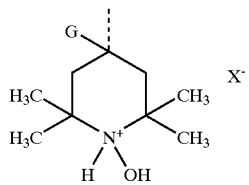    IA where
  G is hydrogen, amino, hydroxyl or cyano;
  E is oxyl; hydroxyl; alkoxy; alkoxy substituted by hydroxyl, oxo or carboxy or interrupted by oxygen or carboxy; cycloalkoxy; alkenyloxy; cycloalkenyloxy; aralkyl; aralkoxy; acyl; R(C=O)O—; RO(C=O)O—; RN(C=O)O— or chloro, where R is an aliphatic or aromatic moiety;

and bridging groups B are selected from the direct bond, carbonyl, or one of the following formulae 3 to 17

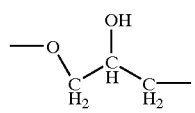    (3)

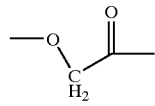    (4)

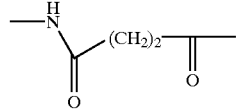    (5)

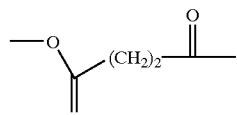    (6)

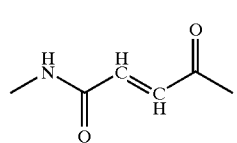    (7)

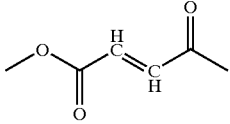    (8)

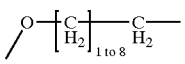    (9)

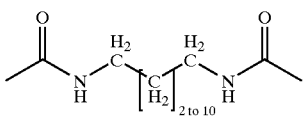    (10)

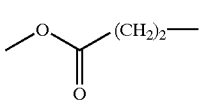    (11)

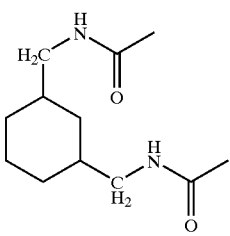    (12)

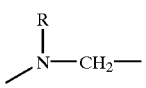    (13)

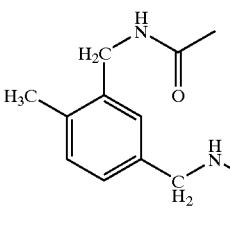    (14)

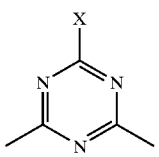    (15)

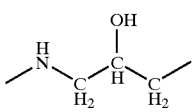    (16)

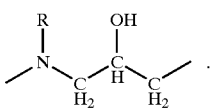    (17)

2. A stabilizer according to claim 1 where E in group A of formula I is selected from oxyl, hydroxyl, $C_1$–$C_{18}$alkoxy; $C_3$–$C_{18}$alkoxy substituted by hydroxyl, oxo or carboxy or interrupted by oxygen or carboxy; $C_5$–$C_{12}$cycloalkoxy; $C_3$–$C_{12}$alkenyloxy; cyclohexenyloxy; aralkyl or aralkoxy of 7 to 15 carbon atoms; $C_1$–$C_{12}$acyl; R(C=O)O—, RO(C=O)O—, RN(C=O)O—, where R is $C_1$–$C_{18}$alkyl, phenyl, $C_7$–$C_1$–$C_5$phenylalkyl, cyclohexyl, $C_2$–$C_3$alkenyl.

3. A stabilizer according to claim 1 where the bridging groups B are a direct bond, carbonyl, or are of the formula 3, 4, 5, 7, 9 or 11.

4. A stabilizer according to claim 1, where in for formula I, E is oxyl or hydroxyl and G is hydrogen.

5. A polymeric stabilizer according to claim 1 which is the reaction product of a polymer as recited in claim 1 with one or more compounds of the formula III to IXA

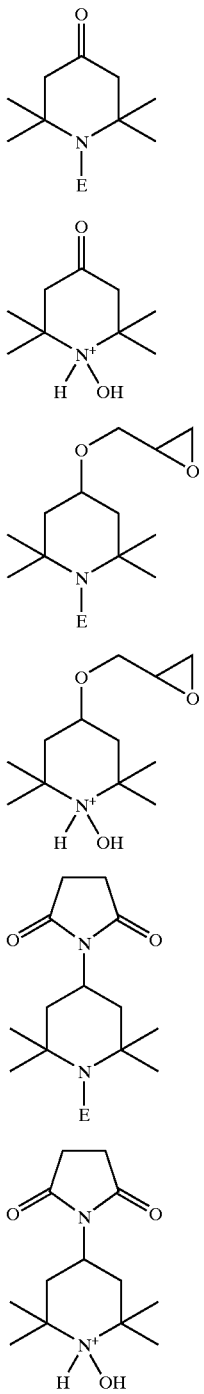

III

IIIA

IV

IVA

V

VA

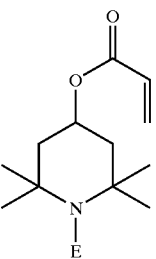

VI

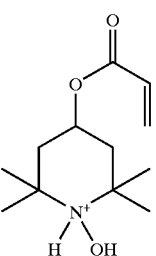

VIA

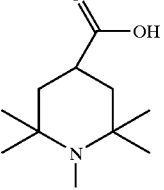

VII

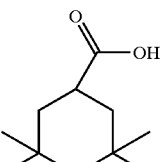

VIIA

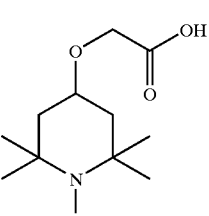

VIII

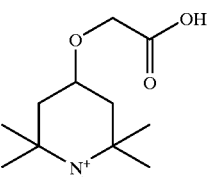

VIIIA

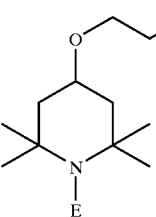

IX

-continued

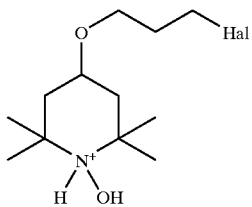

IXA wherein Hal in formulae IX and IXA stands for halogen, and

E is as described for formula I of claim 1.

6. A polymeric stabilizer according to claim 5, which is the reaction product of a polyethylene imine 1), or of an oligomeric ethylene amine 2), or of a a polymer 8)

with one or more compounds of the formula III to IXA;

or of a random copolymer 3) with one or more of the compounds of formulae III to XA;

or of a polyacrylamide 4) with one or more of the compounds of formula IV, IVA, IX, IXA;

or of a random oligomer or polymer 5) with one or more of the compounds of formula IV, IVA, IX and IXA;

or of a diol 6) with one or more of the compounds of formula IV, IVA, VII, VIIA, VIII, VIIIA, IX and IXA;

or of polymer 7) of the formula

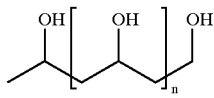

with one or more of the compounds of formula IV, IVA, VII, VIIA, VIII, VIIIA, IX and IXA;

or of a polymer 10) with one or more of the compounds of formula IV and IVA.

7. A polymeric stabilizer according to claim 6, which is the reaction product of a polyethylene imine 1), or of an oligomeric ethylene amine 2), or of a random copolymer 3), or of a polymer 8), or of a polymer 10), with one or more compounds of the formula III IV, or IX, wherein Hal is Cl or Br and E is oxyl or OH.

8. A process for preventing the loss of brightness and for enhancing resistance to yellowing of a pulp or paper, which comprises treating said pulp or paper with an effective stabilizing amount of a polymeric stabilizer according to claim 1.

9. A process of claim 8 wherein the pulp or paper is a chemimechanical or thermomechanical pulp or paper which still contains lignin.

10. A process according to claim 8 wherein the effective stabilizing amount of the polymeric stabilizer is 0.001 to 5% by weight based on the pulp or paper.

11. A process according to claim 8 which comprises treating said pulp or paper with an effective stabilizing amount of a combination of said polymeric stabilizer and at least one coadditive selected from the group consisting of the UV absorbers, the polymeric inhibitors, the sulfur containing inhibitors, the phosphorus containing compounds, the nitrones, the benzofuran-2-ones, fluorescent whitening agents, hindered amine hydroxylamines and salts thereof, hindered amine nitroxides and salts thereof, hindered amines and salts thereof, benzofuran-2-ones and metal chelating agents.

12. A process according to claim 11 wherein the effective amount of the coadditive is 0.001 to 5% by weight based on the pulp or paper.

* * * * *